(12) United States Patent
Iida

(10) Patent No.: US 7,539,512 B2
(45) Date of Patent: May 26, 2009

(54) ELECTRONIC DEVICE, RADIO COMMUNICATION TERMINAL AND DATA TRANSMISSION METHOD

(75) Inventor: Izumi Iida, Shiojiri (JP)

(73) Assignee: Seiko Epson Corporation (JP)

( * ) Notice: Subject to any disclaimer, the term of this patent is extended or adjusted under 35 U.S.C. 154(b) by 644 days.

(21) Appl. No.: 11/362,584

(22) Filed: Feb. 24, 2006

(65) Prior Publication Data

US 2006/0194607 A1 Aug. 31, 2006

(30) Foreign Application Priority Data

Feb. 28, 2005 (JP) ............................. 2005-052599

(51) Int. Cl.
*H04M 1/00* (2006.01)
(52) U.S. Cl. .............. 455/550.1; 455/553.1; 455/575.3; 455/575.7
(58) Field of Classification Search .............. 455/550.1, 455/575.3, 562.1, 101, 558, 277.1, 90, 575, 455/73, 90.2, 522, 436, 556.1, 228, 15, 41.1, 455/425, 501, 67.16
See application file for complete search history.

(56) References Cited

U.S. PATENT DOCUMENTS 7,450,911 B1 * 11/2008 Venkatesh .................... 455/73

2004/0137933 A1 * 7/2004 Taira et al. ................... 455/522
2005/0266850 A1 * 12/2005 Watanabe et al. ............ 455/436
2007/0197259 A1 * 8/2007 Kota et al. ................ 455/556.1

FOREIGN PATENT DOCUMENTS

| JP | 05-110609 | 4/1993 |
| JP | 2002-171321 | 6/2002 |
| JP | 2003-283369 | 10/2003 |
| JP | 2003-298470 | 10/2003 |
| JP | 2005-210611 | 8/2005 |
| JP | 2005-217799 | 8/2005 |
| JP | 2005-223411 | 8/2005 |

* cited by examiner

*Primary Examiner*—Tan Trinh
(74) *Attorney, Agent, or Firm*—Harness, Dickey & Pierce, P.L.C.

(57) ABSTRACT

An electronic device includes: a radio transmitting part which transmits, by radio, transmission data having a real transmission data portion and a preamble portion mixed, the preamble portion constituted by pseudo noise signals arranged in a given pattern; a radio receiving part near the radio transmitting part, which receives transmission data transmitted from the radio transmitting part and has a phase-adjusting control part, the phase-adjusting control part adjusting a phase of a received local oscillator output based on the pseudo noise signals of the preamble portion; and a wire communication part which communicates a timing of transmitting the preamble portion in the transmission data transmitted by the radio transmitting part to the radio receiving part by wire.

7 Claims, 10 Drawing Sheets

ELECTRONIC DEVICE, RADIO COMMUNICATION TERMINAL AND DATA TRANSMISSION METHOD

BACKGROUND

1. Technical Field

The present invention relates to an electronic device, a radio communication terminal, and data transmission method. Specifically, it is suitable for an electronic device and a radio communication terminal having two parts close to each other as a clamshell type cellular telephone unit, in which data transmission is performed between the parts.

2. Related Art

In regard to a cellular telephone in recent years, the efforts to make higher the resolution of a liquid crystal display device incorporated in the cellular telephone have been made to enable finer display of a still image shot by a digital camera and a moving image as well as still images of a character, a graphic symbol, etc. In parallel to this, the amount of data communicated between a digital camera and a liquid crystal display device has been increased. As a result, it has been proposed to use a high-speed transfer method, LVDS (Low Voltage Differential Signaling), for connections of a display unit and an imaging device.

Also, as for a cellular telephone in recent years, a clamshell structure that enables the cellular telephone to be folded has been adopted to upsize a display unit and prevent an operation button from being pushed accidentally when the cellular telephone is carried, without loss of portability of cellular telephones. According to the clamshell structure, a first body part incorporating a control part that is mainly responsible for an external radio communication function of a cellular telephone and a second body part equipped with a display unit are coupled through a hinge, and the first and second body parts can be opened and closed using the hinge.

On the other hand, in the situation where the resolution of a display unit incorporated in a cellular telephone is made higher increasingly, the multiple pin technique has to be applied to a flexible wiring board to send a signal to the display unit for the purpose of sending image data or the like to the display unit by wire at a high bit rate. In the case of a cellular telephone of the clamshell structure, when data transmission between the first and second body parts is performed by wire, it is required to engage a flexible wiring board to which the multiple pin technique is applied with the hinge, which makes the structure of the hinge more complicated and the mounting process more troublesome. Therefore, a method of performing data transmission between the first and second body parts by internal radio communication has been proposed, by which internal radio communication antennas are provided on the first and second body parts respectively instead of the flexible wiring board.

For example, JP-A-2002-171321 discloses a mobile radio terminal including a radio unit and an operation unit, which can be separated from each other, for radio communications with a base station, and a method of sending/receiving sound and image data, by which sound and image data are sent/received by electrically connecting the radio and operation units through connectors included in the units respectively, in the condition where the units are integrated, and sound and image data are sent/received by Blue tooth radio communication between the units in the condition where the units are separated.

Now, there are two detection methods for digital radio communication, synchronous detection and asynchronous detection. The asynchronous detection includes delay detection and envelope detection, which is inferior in bit error rate characteristic to synchronous detection. On the other hand, with the synchronous detection, a sign can be detected and discriminated using as a reference a carrier reproduced based on received signals, as disclosed in e.g. JP-A-05-110609.

However, the synchronous detection has an unsolved problem such that it requires a circuit to reproduce a carrier, which increases the circuit scale and power consumption.

In the digital radio communication system, phase modulation such as BPSK or QPSK is often used. The following procedures have been devised. That is, on the receiving side, a receiving mixer converts the phase-modulated transmission data in frequency using a local oscillator output into a received base band signal. The received base band signal is supplied to a low-pass filter to remove the noise thereof and then binarized by a limiter, and supplied to a base band processing part. However, in this case, when the phase of the received local oscillator output, which is multiplied in the receiving mixer, is coincident with that of the carrier on the transmission side, the received base band signal resulting from filtering by the low-pass filter is maximized in its amplitude as shown in FIG. 8A. The received base band signal is binarized in the limiter into a binarized base band signal. The binarized base band signal is made a normal base band signal as shown in FIG. 8B. In the case where the phase of the received local oscillator output differs from that of the sent carrier by 45°, the received base band signal resulting from filtering by the low-pass filter is somewhat reduced in amplitude as shown in FIG. 9A, whereas the binarized base band signal resulting from binarization of this post-filtering signal by the limiter allows the reproduction of substantially normal base band signal, as shown in FIG. 9B.

However, in the case where the phase of the received local oscillator output differs from that of the sent carrier by 90°, the received base band signal resulting from filtering by the low-pass filter is remarkably reduced in amplitude as shown in FIG. 10A. The binarized base band signal resulting from binarization of this post-filtering signal by the limiter is in a condition such that it is hard to discriminate between a signal and a noise, as shown in FIG. 10B.

On this account, as a method of adjusting the phase of the received local oscillator output in the past, there have been used a method of maximizing the received base band signal by an analog feed-back system, a method of using a digital feed-back system with a multi-bit A/D converter and a matched filter to monitor, by which the amplitude information is monitored by a digital control part to adjust the phase, etc.

However, the analog feed-back system has an unsolved problem such that fine adjustments of a time constant of a circuit, etc. are difficult, and a filter circuit for feed back and others increase the cost and power consumption.

On the other hand, the digital feed-back system has an unsolved problem such that it is high in control flexibility, but use of the multi-bit A/D converter inevitably increases the cost and power consumption. Incidentally, there is an alternative method, by which a limiter amplifier or the like is used and a one-bit A/D converter digitalizes only the phase information. However, such method has an unsolved problem such that it is required to additionally provide some means of detecting the amplitude level of a received base band signal, which inevitably increases the cost and power consumption.

SUMMARY

An advantage of some aspects of the invention is to provide an electronic device, a radio communication terminal, and a data transmission method, by which the phase adjustment of a received local oscillator output can be performed with their simple configurations and low power consumption.

To solve the above-described problems, an electronic device in association with the first technical means includes: a radio transmitting part which transmits, by radio, transmission data having a real transmission data portion and a preamble portion mixed, the preamble portion constituted by pseudo noise signals arranged in a given pattern; a radio receiving part near the radio transmitting part, which receives transmission data transmitted from the radio transmitting part and has a phase-adjusting control part, the phase-adjusting control part adjusting a phase of a received local oscillator output based on the pseudo noise signals of the preamble portion; and a wire communication part which communicates a timing of transmitting the preamble portion in the transmission data transmitted by the radio transmitting part to the radio receiving part by wire.

According to the first technical means, in the case where transmission data is transmitted by wire between a radio transmitting part and a radio receiving part located near to each other, on the transmission side, transmission data is formed, in which a real transmission data portion having transmission data and a preamble portion composed of pseudo noise signals arranged in a given pattern are mixed. The transmission data is transmitted to the radio receiving part, whereby the radio receiving part adjusts in phase a received local oscillator output based on pseudo noise signals of the preamble portion. Thus, correct phase adjustment can be performed. Further, the wire communication part communicates a timing of transmitting the preamble portion included in the transmission data at this time to the radio receiving part by wire and as such, the preamble portion can be detected in the radio receiving part easily without detection means to detect the preamble portion in the radio receiving part. In addition, The preamble portion is constituted by pseudo noise signals arranged in a given pattern and as such, the pseudo noise signal can be reproduced correctly even when a limiter composed of a one-bit A/D converter is used on the receiving side. Therefore, it is possible to perform correct phase adjustment using a simple configuration.

An electronic device in association with the second technical means is the electronic device in association with the first technical means, wherein the radio transmitting part is arranged so as to BPSK-modulate and transmit the preamble portion.

According to the second technical means, the preamble portion of transmission data is BPSK-modulated and sent and, whereby the pseudo noise signals can be reproduced easily by the limiter part constituting a one-bit A/D converter on the receiving side.

Further, the electronic device in association with the third technical means is the electronic device in association with the first technical means, wherein the preamble portion is formed by repeating a pseudo noise signal string composed of a given number of bits at least two times.

According to the third technical means, the preamble portion is composed of pseudo noise signal strings and as such, the correlation of the pseudo noise signal strings with reference pseudo noise signal strings differing in phase formed based on the received local oscillator outputs differing in phase in the receiving side is acquired. Thus, phase adjustment of the received local oscillator output can be performed correctly in an instant.

Further, an electronic device in association with the fourth technical means is the electronic device in association with the first technical means, wherein the radio receiving part includes: a frequency-converting part which converts a frequency of received data when receiving transmission data from the radio transmitting part; a limiter part which binarizes a frequency-converted signal output from the frequency-converting part; a correlator which detects a correlation between the pseudo noise signals of the preamble portion output from the limiter part based on the timing of transmitting the preamble portion input from the wire communication part and reference pseudo noise signals produced based on a local oscillator output input thereto; a local oscillator which produces the local oscillator output; and a phase-adjusting control part which the local oscillator adjusts in phase and outputs a local oscillator output to the correlator and the frequency-converting part, and determines the phase of the local oscillator output to be output, based on a detected correlation signal from the correlator.

According to the fourth technical means, the correlator detects the correlation between pseudo noise signal of the preamble portion input from the limiter part and the reference pseudo noise signal produced based on a local oscillator output while the phase-adjusting part adjusts in phase the local oscillator, whereby the phase of the local oscillator can be synchronized with the local oscillator output on the transmission side easily.

Still further, an electronic device in association with the fifth technical means is the electronic device in association with the first technical means, wherein the wire communication part includes: a mixing unit which superposes a control signal representing the timing of transmitting the preamble portion on a voltage of a source line; and a separator which separates the control signal mixed by the mixing unit from the voltage of the source line.

According to the fifth technical means, a control signal representing a timing of transmitting the preamble portion is communicated to the receiving side through the source line by wire and as such, the number of interconnections between the transmitting and receiving parts can be reduced.

In addition, a radio communication terminal in association with the sixth technical means includes: a first body part; a second body part coupled with the first body part; a coupling part which couples the first and second body parts so that locational relation between the first and second body parts can be changed; an external radio communication antenna attached to one of the first and second body parts; an external radio communication control part incorporated in the first body part, which is mainly responsible for control of external radio communication performed through the external radio communication antenna; a display part incorporated in the second body part; a first internal radio communication antenna attached to the first body part; a second internal radio communication antenna attached to the second body part; a first internal radio communication control part incorporated in the first body part, the control part responsible for control of internal radio communication by which transmission data having a real transmission data portion and a preamble portion mixed is transmitted through the first internal radio communication antenna, the preamble portion constituted by pseudo noise signals arranged in a predetermined pattern; a second internal radio communication control part incorporated in the second body part and having a phase-adjusting control part which controls in phase a received local oscillator output based on the pseudo noise signals of the preamble portion when receiving the transmission data through the second internal radio communication antenna; and a wire communication part which communicates a timing of transmitting the preamble portion in the transmission data transmitted by the first internal radio communication control part to the second internal radio communication control part by wire.

According to the sixth technical means, in a radio communication terminal such as a cellular telephone or a PDA, when its first housing and second housing are connected through a coupling part so that locational relation therebetween can be changed mutually, data transmission between them is executed by wireless, and a control signal representing a timing of transmitting the preamble portion of transmission data transmitted from the wire communication part is sent by wire communication, thereby to perform the phase adjustment of the received local oscillator output in the receiving part. Therefore, the correlation between the pseudo noise signals included in the preamble portion and the reference pseudo noise signals can be detected using a simple configuration. Further, phase adjustment of the local oscillator output on the receiving side can be performed easily and correctly.

Further, a data transmission method in association with the seventh technical means includes the steps of: transmitting transmission data having a real transmission data portion and a preamble portion mixed from a radio transmitting part by radio, the preamble portion constituted by pseudo noise signals arranged in a predetermined pattern; communicating a timing of transmitting the preamble portion in the transmission data to be transmitted by the radio transmitting part to a radio receiving part located near the radio transmitting part by wire; and receiving transmission data transmitted from the radio transmitting part while adjusting in phase a received local oscillator output based on pseudo noise signals of the preamble portion based on the timing of transmitting the preamble portion communicated by wire.

With the seventh technical means, as in the case of the first technical means, the received local oscillator output can be adjusted in phase correctly in the receiving side. The wire communication part sends the timing of transmitting the preamble portion included in the transmission data at this time to the radio receiving part by wire communication and as such, the radio receiving part can detects the preamble portion easily without detection means to detect the preamble portion. In addition, the preamble portion is composed of pseudo noise signals arranged in a given pattern and as such, the pseudo noise signal can be reproduced correctly even when a limiter constituted by a one-bit A/D converter is used on the receiving side. Therefore, the phase adjustment can be performed using a simple configuration correctly.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment in the case where the invention is applied to a cellular telephone will be described below with reference to the drawings.

Figure 1:
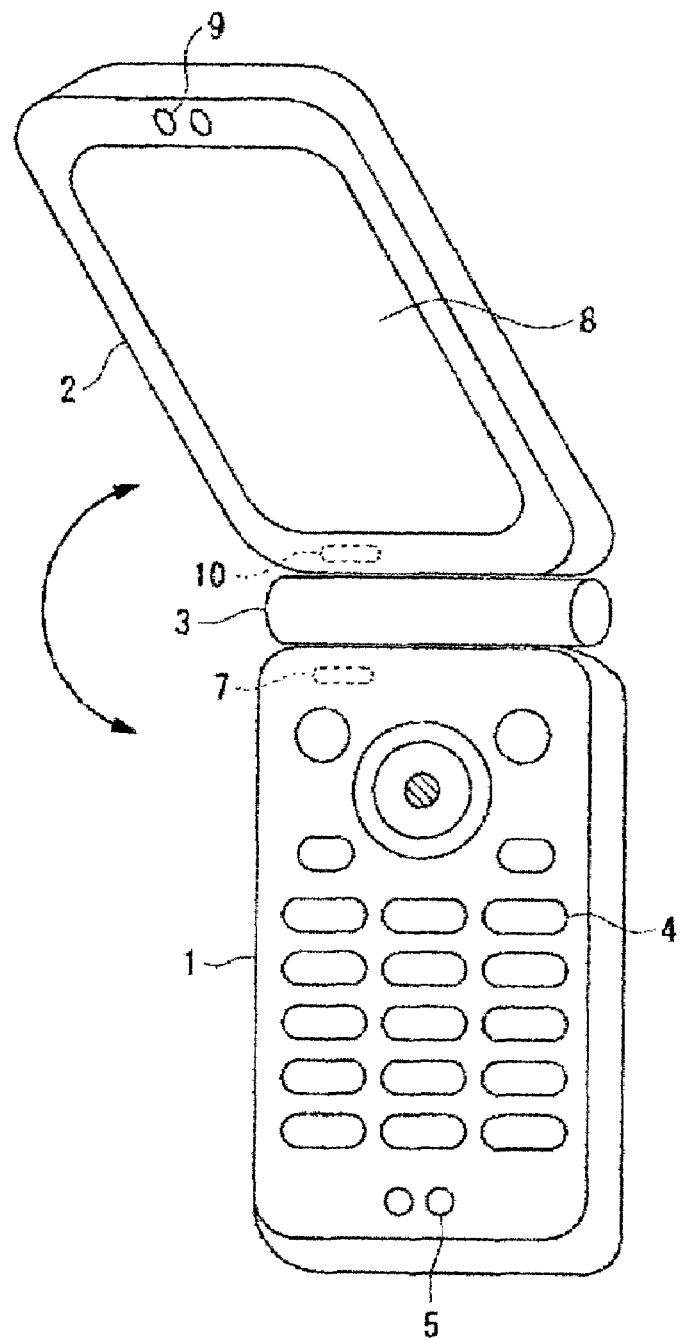
FIG. 1 is a perspective view showing a condition when a clamshell type cellular telephone is opened, which shows an embodiment of the invention.
Figure 2:
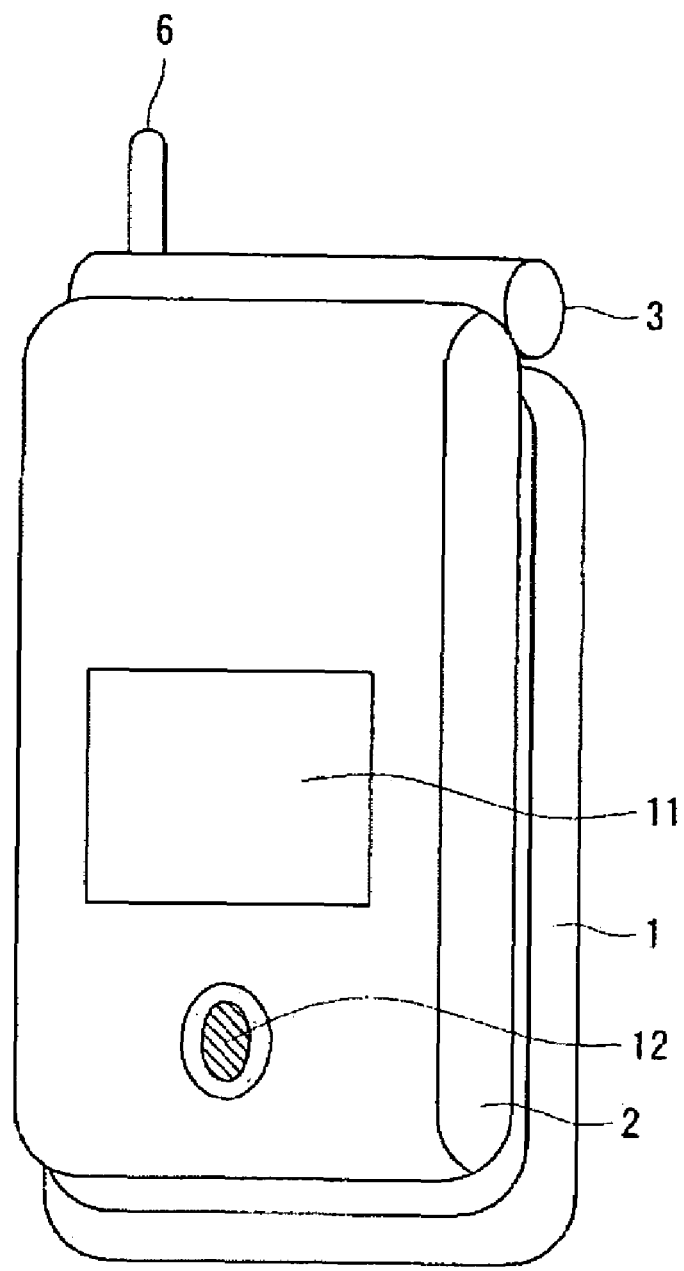
FIG. 2 is a perspective view showing a condition when the clamshell type cellular telephone in FIG. 1 is closed.

FIG. 1 is a perspective view showing a condition when a clamshell type cellular telephone is opened. FIG. 2 is a perspective view showing a condition when the clamshell type cellular telephone is closed.

As in FIGS. 1 and 2, the cellular telephone has: a first body part 1; a set of operation buttons 4 arranged on the side of a surface of the first body part 1; a microphone 5 provided in a lower end portion of the first body part 1; and an external radio communication antenna 6 attached to an upper end portion of the first body part 1. Also, the cellular telephone has a second body part 2; a display unit 8 provided on the side of a surface of the second body part 2; and a speaker 9 provided in an upper end portion of the second body part 2. Further, the cellular telephone has a display unit 11 and an imaging device 12 provided on the side of a rear surface of the second body part 2. It is noted that the display units 8 and 11 may be e.g. a liquid crystal display panel, an organic EL panel, or a plasma display panel. In addition, a CCD, a CMOS sensor, or the like may be used as the imaging device 12. Internal radio communication antennas 7 and 10, which carry out internal radio communications between the first and second body parts 1 and 2, are provided on the first and second body parts 1 and 2 respectively.

The first and second body parts 1 and 2 are coupled through a hinge 3, and the second body part 2 can be folded over the first body part 1 by swinging the second body part 2 using the hinge 3 as a fulcrum. The second body part 2 is closed so that it overlies the first body part 1, whereby the set of operation buttons 4 can be protected by the second body part 2. Therefore, it is possible to prevent the operation button 4 from being pushed when a cellular telephone is carried. Also, by opening the second body part 2 away from the first body part 1, the following are made possible: to push the operation button 4 while watching the display unit 8; to talk by telephone while using the speaker 9 and the microphone 5; and to take an image while pushing the operation button 4.

Use of the clamshell structure here enables the display unit 8 to be arranged substantially all over a surface of the second body part 2 and as such, it becomes possible to enlarge the size of the display unit 8 without loss of portability of a cellular telephone and thus the visibility can be enhanced.

Further, the internal radio communication antennas 7 and 10 are provided on the first and second body parts 1 and 2 respectively, which enables data transmission between the first and second body parts 1 and 2 by internal radio communication with the internal radio communication antennas 7, 10. For example, image and sound data captured through the external radio communication antenna 6 on the first body part 1 can be sent to the second body part 2 by internal radio communication with the internal radio communication antennas 7, 10. Then, an image thereof can be displayed by the display unit 8 and the sound can be output through the speaker 9. Also, photographed image's data taken by the imaging device 12 can be sent from the second body part 2 to the first body part 1 by internal radio communication with the internal radio communication antennas 7, 10 and then can be sent out through the external radio communication antenna 6 to the outside.

Thus, the need to perform data transmission between the first and second body parts 1 and 2 by wire is eliminated, and therefore the need to engage a flexible wiring board to which the multiple pin technique is applied with the hinge 3. This makes the following possible: to suppress an increase in complexity of the structure of the hinge 3; and to prevent a mounting process from becoming more troublesome. Thus, cellular telephones can be made more compact and slimmer and increased in their reliability while an increase of the cost can be suppressed. In addition, it is possible to achieve a cellular telephone with a larger screen and more functions without loss of portability of a cellular telephone.

In the above-described embodiment, a method of attaching the external radio communication antenna 6 onto the first body part 1 has been described, the external radio communication antenna 6 may be attached on the second body part 2.

Figure 3:
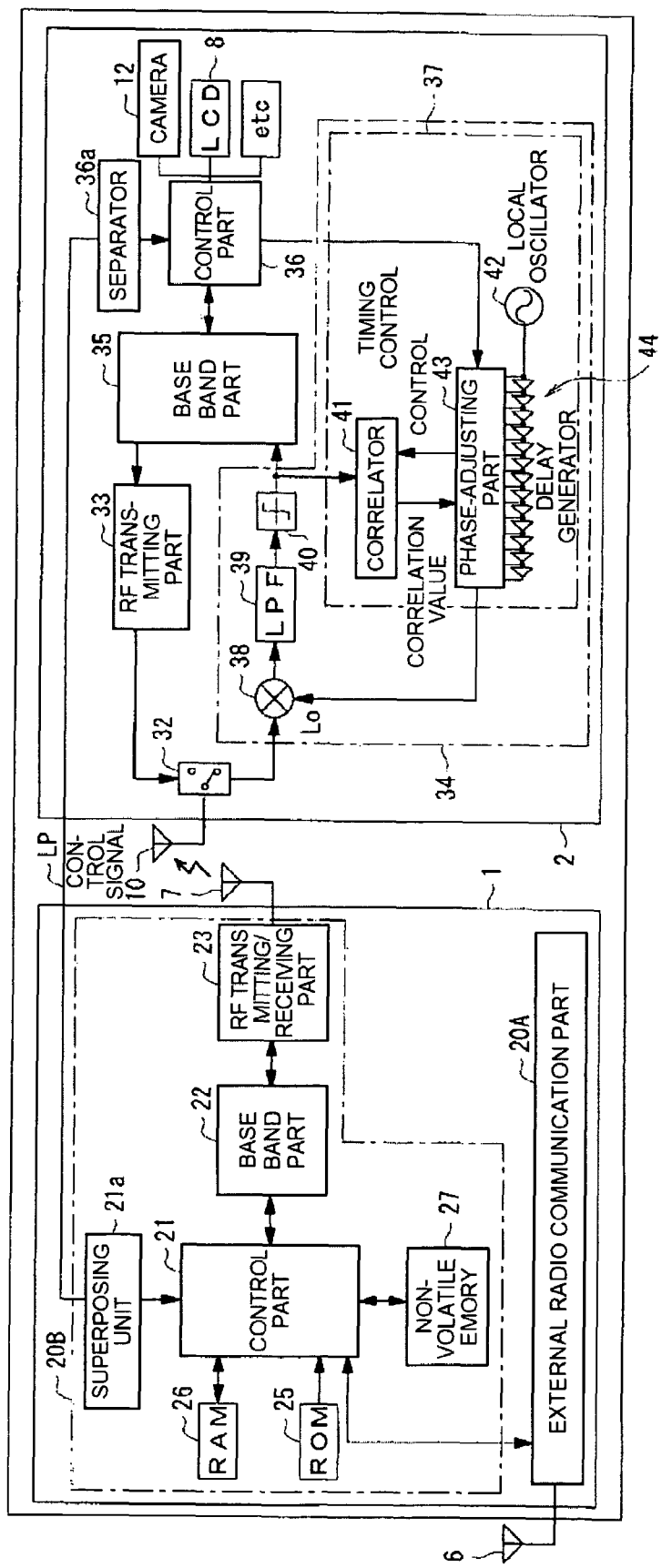
FIG. 3 is a block diagram showing a data transmission mechanism between a first body part and a second body part.

The data transmission between the first and second body parts 1 and 2 is performed as shown with reference to FIG. 3. That is, the first body part 1 includes: an external radio communication part 20A connected to the external radio communication antenna 6, which performs radio communications with an external base station and has the function as a cellular telephone, the function of sending and receiving E-mails, the function of downloading data, etc.; and an internal radio communication part 20B which sends/receives image data, etc. to/from the second body part 2 by internal radio communication.

The internal radio communication part 20B includes: a control part 21 constituted by e.g. a microprocessor; a base band processing part 22; and an RF transmitting/receiving part 23, in which the RF transmitting/receiving part is connected to the above-described internal radio communication antenna 7. The control part 21 is connected with: a Read Only Memory (hereinafter referred to as ROM) 25 that stores a control program thereof; a Random Access Memory (hereinafter referred to as RAM) 26 that stores data during a calculating process and the result of the calculation by the control part 21; the set of operation buttons 4 as input means, which have been described above; a nonvolatile memory 27 such as a flash memory, which stores image data.

Figure 4:
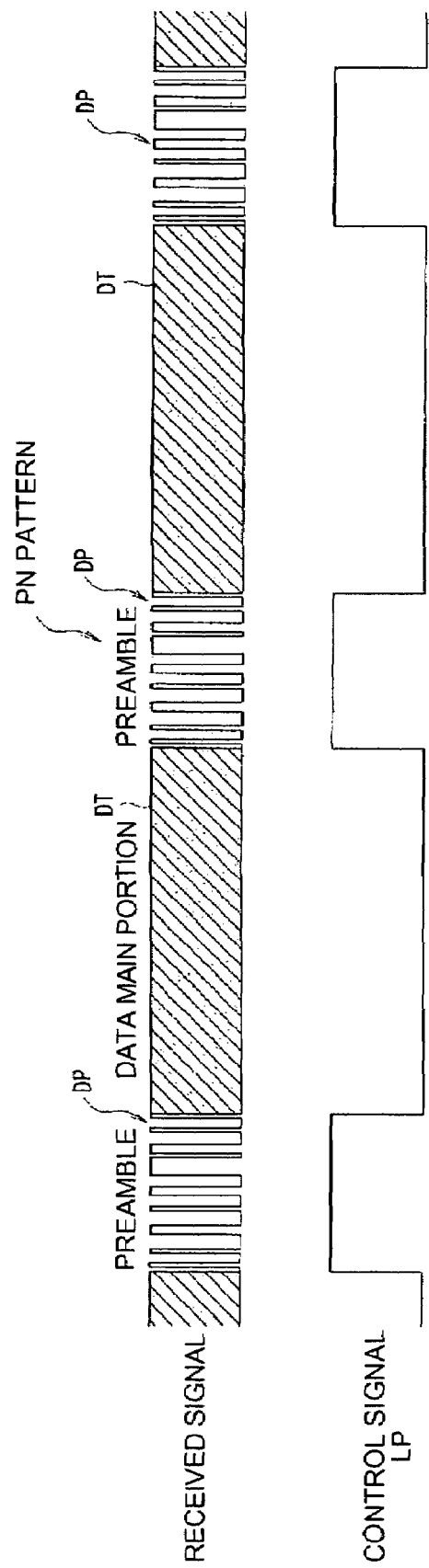
FIG. 4 is an illustration showing the relation between a transmission data frame and a control signal.
Figure 5:
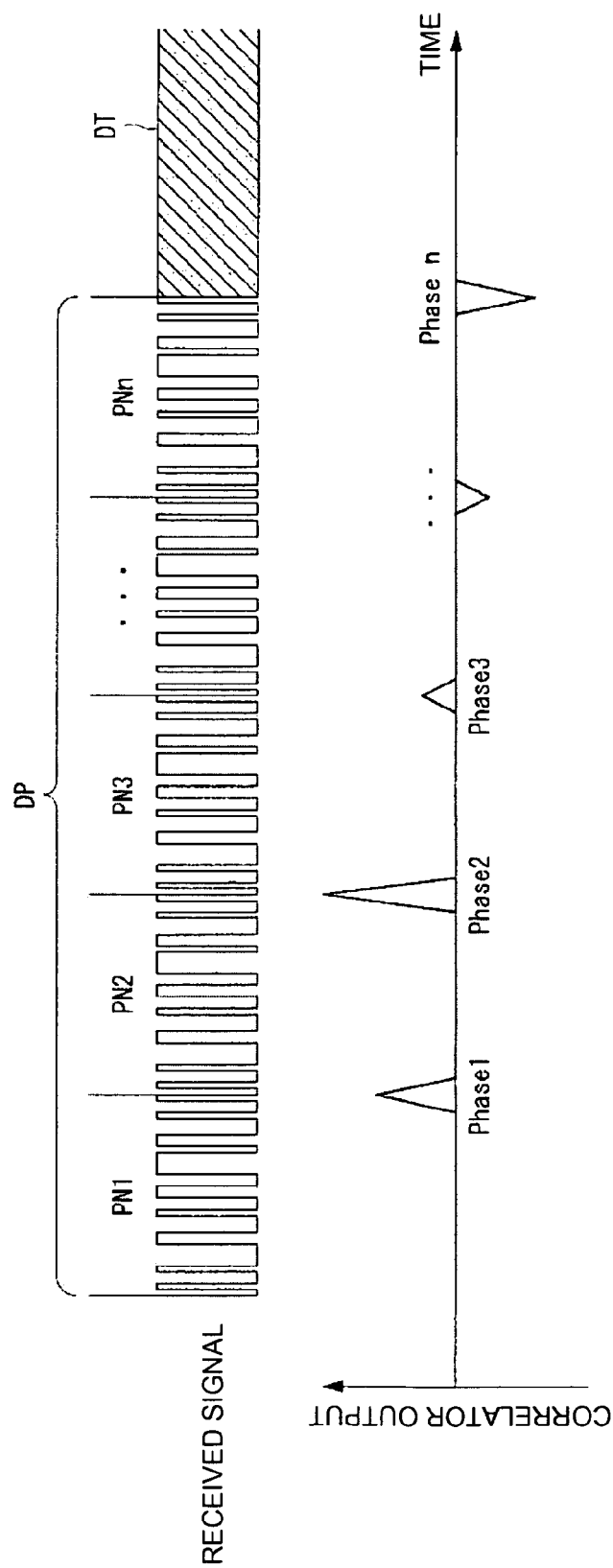
FIG. 5 is an illustration showing the relation between pseudo noise signal strings of a preamble portion of a transmission data frame and correlation values.

The control part 21 executes a display data-sending process of sending out character data and image data stored in the nonvolatile memory 27 to the display unit 8 of the second body part 2, and an image data-storing process of storing image data taken by the imaging device 12 of the second body part 2 in the nonvolatile memory 27. In the display data-sending process, a transmission data frame is formed and output to the base band processing part 22. The transmission data frame includes: a real transmission data portion DT, in which display data to be sent actually is arranged; and a preamble portion DP containing PN (Pseudo Noise) signals in a given pattern interposed a given interval apart from the adjacent real transmission data portion, as shown in FIG. 4. In addition, the control part 21 has a superposing unit 21a included in a wire communication part. The superposing unit superposes, on a voltage of a source line LP supplying an electric power to the second body part 2, a control signal controlled so as to be in ON state showing that it is a preamble portion in sending a preamble portion DP as shown in FIG. 4. Here, the preamble portion. DP is constituted by n (two or more) pseudo noise signal strings PN1-PNn, having the same signal pattern, as shown in FIG. 5. Also, in the image data-storing process, image data processed in the base band processing part 12 is stored in the nonvolatile memory 27.

The base band processing part 22 has: the function of performing a base band signal process including data processing according to a transmitting/receiving format on transmission data supplied from the control part 21 and received data received by the RF transmitting/receiving part 23, and data processing of character data and image data; and the function of performing a control process including control of communication and control of a peripheral circuit.

The RF transmitting/receiving part 23 performs processes similar to those that the RF transmitting part 33 and RF receiving part 34 in the second body part 2, which are to be described later, carry out. When a base band signal processed in the base band processing part 22 is input to the RF transmitting/receiving part 23, the part 23 performs a BPSK (Binary Phase Shift Keying) modulation process on the input signal, and performs frequency conversion on the resultant signal into a transmitting signal, and outputs the transmitting signal to the internal radio communication antenna 7, provided that in the frequency conversion, the signal is up-converted based on a local oscillator output. Also, the RF transmitting/receiving part 23 performs down-conversion on a received signal input from the internal radio communication antenna 7 based on the local oscillator output, thereby to convert in frequency the received signal into a base band signal, and then supplies the resultant signal to the base band part 22.

On the other hand, the second body part 2 includes: a transmitting/receiving changeover switch 32 connected to the above-described internal radio communication antenna 10; an RF transmitting part 33; an RF receiving part 34; a base band processing part 35; and a control part 36 including a microprocessor. To the control part 36, a display unit 8 constituted by a liquid crystal display, an organic EL display or the like and a digital camera 12 are connected.

The RF transmitting part 33 converts a base band signal in frequency into a transmitting signal by up-conversion using a local oscillator output and outputs the transmitting signal to the internal radio communication antenna 10 through the changeover switch 32, provided that the base band signal includes a real transmission data portion containing image data output from the base band processing part 35, and a preamble portion constituted by the above-described pseudo noise signals interposed a given interval apart from the adjacent real transmission data portion.

The RF receiving part 34 has: a mixer 38, which is supplied with the phase-adjusted local oscillator output supplied from the phase-adjusting control part 37, and down-converts a received signal input from the transmitting/receiving changeover switch 32 thereby to convert in frequency the received signal into a base band signal; a low-pass filter 39 that removes noise of the base band signal output from the mixer; and a limiter 40, which a filter output from the low-pass filter 39 is, input to, and which is constituted by a one-bit A/D converter and binarizes the base band signal. The output of the limiter 40 is supplied to the base band processing part 35 and the phase-adjusting control part 37.

The phase-adjusting control part 37 includes: a correlator 41 that produces a reference pseudo noise signal based on local oscillator outputs input from the phase-adjusting part 43 to be described later when the limiter 40 outputs a preamble portion of a received signal, and detects the correlation between the reference pseudo noise signal and a pseudo noise signal included in the preamble portion input from the limiter 40; a local oscillator 42 that outputs a local oscillator output of a given frequency; and a phase-adjusting part 43 that adjusts the phase of a local oscillator output of the local oscillator 42 so that the correlation value input from the correlator 41 is made maximum, and outputs the local oscillator output to the mixer 38.

Here, a delay generator 44 sequentially delays a local oscillator output, which is output by the local oscillator 42 to be described later. The phase-adjusting part 43 sequentially selects delayed local oscillator outputs that is sequentially delayed by the delay generator 44 corresponding to the pseudo noise signal string and outputs the selected delayed local oscillator outputs to the mixer 38 and the correlator 41 while a timing control signal representing a preamble portion input from the control part 36 is input, and outputs a delayed local oscillator output that maximizes the correlation value input from the correlator 41 as a received local oscillator output to the mixer 38 and the correlator 41.

The control part 36 has the same configuration as that of the control part 21 of the above-described first body part 1. The control part 36 performs a display data process in which it outputs display data to the display unit 8 connected thereto, and an image data-sending process in which it sends image data input from the digital camera 12 to the first body part 1. The control part 36 includes a separator 36a included in the wire communication part, which separate a control signal superposed on the voltage of the source line LP by the superposing unit 21a in the control part 21 of the first body part 1. The control part 36 outputs the control signal separated by the separator 36a to the phase-adjusting part 42 in the phase-adjusting control part 37.

Now, the operations in the above embodiment will be described.

When it is assumed that the first body part 1 is in its power-off state, the power source that supplies the second body part 2 with electric power through the source line LP is in its off state, and the constituent elements of the first body part 1 are in a non-activated state and the constituent elements of the second body part 2 are in a non-activated state.

In this condition, when a power source button formed as one of the set of operation buttons 4 of the first body part 1 is pushed to turn on the power source, the parts in the first body part 1 are supplied with electric power and concurrently the electric power is supplied to the parts in the second body part 2 through the source line LP.

Under such condition where the power source is in ON state, for example, in the case where image data stored in the nonvolatile memory 27 of the first body part 1 are displayed on the display unit 8 of the second body part 2, the control part 21 is made to carry out the display data-sending process by selecting a given image display button arranged as one of the set of operation buttons 4, and then the image data stored in the nonvolatile memory 27 are read out sequentially. Then, the control part 21 creates a transmission data frame including a real transmission data portion having the image data stored therein and a preamble portion interposed a given interval apart from the adjacent real transmission data portion and constituted by a given number of pseudo noise signal strings. Subsequently, the control part 21 outputs the transmission data frame to the base band part 22 and concurrently outputs a control signal to the superposing unit 21a, provided that the control signal is in its ON state while a preamble portion DP is sent.

Therefore, the base band processing part 22 carries out a given base band process on a transmission data frame input from the control part to form a base band signal. Then, the base band processing part 22 supplies the base band signal to the RF transmitting/receiving part 23. The RF transmitting/receiving part 23 performs BPSK modulation on the base band signal, converts the resultant signal in frequency to form a transmitting signal, and outputs the transmitting signal to the internal radio communication antenna 7, whereby the transmitting signal is sent to the second body part 2.

In the second body part 2, the internal radio communication antenna 10 receives the transmitting signal sent from the internal radio communication antenna 7 of the first body part 1. Then, the received signal is supplied to the RF receiving part 34 through the transmitting/receiving changeover switch 32.

In the RF receiving part 34, the mixer 38 down-converts the received signal into a base band signal and then the noise of the signal is removed in the low-pass filter 39. Thereafter, the resultant signal undergoes one-bit A/D conversion by the limiter 40 to be binarized and supplied to the base band processing part 35 and the phase-adjusting control part 37.

At this time, a control signal kept in its ON state during the time when a preamble portion DP of a transmission data frame sent from the control part 21 of the first body part 1 is sent out is superposed on the voltage of the source line LP by the superposing unit 21a. As a result, the control signal is fed to the second body part 2 by wire communication. Then, the control signal is separated from the source line LP by the separator 36a of the control part 36, input to the control part 36, and then supplied to the phase-adjusting control part 37. Hence, the control signal is in its ON sate when the preamble portion DP is received, and the control signal in such sate is supplied to the phase-adjusting part 43 of the phase-adjusting control part 37. Then, the phase-adjusting part 43 forces the delay generator 44 that serves to sequentially delay local oscillator outputs input from the local oscillator 42 to delays local oscillator outputs, sequentially switches and selects the delayed local oscillator outputs at a timing when the top of the pseudo noise signal string of the preamble portion DP is input, and outputs the selected delayed local oscillator output to the mixer 38 and concurrently to the correlator 41.

Therefore, the correlator 41 produces a reference pseudo noise signal string based on the input delayed local oscillator outputs, and detects the correlation between the reference pseudo noise signal string and a pseudo noise signal string PNi (i=1–n) of a preamble portion input from the limiter 40.

Figure 6:
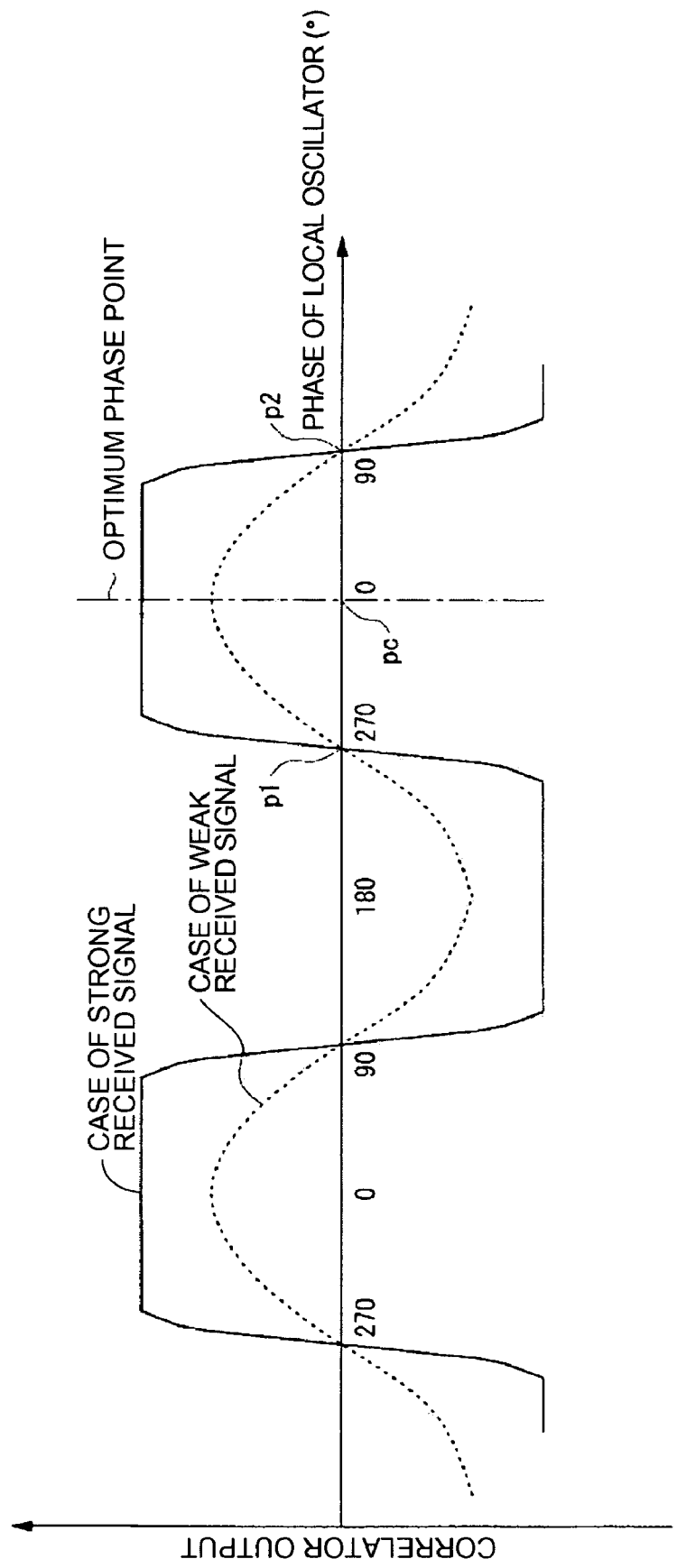
FIG. 6 is an illustration showing the relation between phases of a local oscillator output and correlation values.

On this account, in the case where the received signal is weak, the correlation value output from the correlator 41 is a positive value when the phase difference between a reference pseudo noise signal string produced based on delayed local oscillator outputs output from the phase-adjusting part 43 and a pseudo noise signal string included in an actual preamble portion falls in a range of 270° to 90° and reaches a positive peak value at a phase difference of 0°, and is a negative value when the phase difference falls in a range of 90° to 270° and reaches a negative peak value at a phase difference of 180°, as shown in FIG. 6. When under the condition where the received signal is weak, the phase-adjusting part 43 outputs delayed oscillator outputs obtained by sequentially delaying local oscillator outputs of the local oscillator, correlation values between pseudo noise signal strings included in received preamble signals and reference pseudo noise signals that have been sequentially delayed in phase take on positive and negative values according to the phase differences therebetween, as shown in FIG. 5. In an example shown in FIG. 5, the correlation value for the pseudo noise signal string PN2 is positively maximum and as such, the delayed local oscillator output at this time is set as an optimum phase point, which is supplied to the mixer 38, and its real transmission data portion undergoes down-conversion. The resultant signal is subjected to frequency conversion into a base band signal, noise removal by the low-pass filter 39, and one-bit A/D conversion in the limiter 40, and then supplied to the base band processing part 35.

On the other hand, when the received signal is strong, the correlation value output from the correlator 41 is saturated and thus it has a nearly square wave as shown in FIG. 6. As for an optimum phase point, the correlator 41 detects a phase p0 of the local oscillator output for a zero-cross point at the time when the correlation value turns its direction into positive one, and a phase p1 of the local oscillator output for a zero-cross point at the time when the correlation value turns its direction into negative one, and sets the phase pc of the local oscillator output at (p1−p0)/2 as an optimum phase point representing a peak of correlation values, whereby the local oscillator output at this time is output as a received local oscillator output.

Thus, the received image data is reproduced by the base band processing part 35 correctly and supplied to the control part 36. Then, the data is subjected to image processing according to the display format for the display unit 8 in the control part 36 and then supplied to the display unit 8. As a result, the image data stored in the nonvolatile memory 27 can be displayed on the display unit 8.

In contrast, in the case of storing image data taken by the digital camera 12 in the nonvolatile memory 27, reversely to the above procedures, the control part forms a transmission data frame including a real transmission data portion and a preamble portion consisting of pseudo noise signal strings based on the image data taken by the digital camera 12 of the second body part 2. The base band processing part 35 converts the transmission data frame into base band signals. The base band signals are supplied to the RF transmitting part 33. The RF transmitting part 33 performs BPSK modulation on the base band signals, and up-conversion with the local oscillator outputs, whereby the base band signals are converted in frequency into transmission data. The transmission data are supplied to the internal radio communication antenna 10 through the transmitting/receiving changeover switch 32, whereby the transmission data are sent to the first body part 1.

In the first body part 1, when the signals are received through internal radio communication antenna 7, a synchronizing process with local oscillator outputs, which is similar to the above-described receiving process in the second body part 2 is performed, and then the received base band signals are supplied to the base band processing part 22. The base band processing part 22 performs a given base band process to demodulate the image data and supplies the image data to the control part 21. Then, the control part 21 stores the image data in the nonvolatile memory 27.

In addition the above, the following are possible: to send character data of an E-mail received through the external transmitting/receiving antenna 6 to the display unit 8; and to perform the display data-sending process to display the character data of an E-mail prepared in the control part 21 on the display unit 8 to display the character data on the display unit 8.

As described above, according to the first embodiment, on the transmission side, a transmission data frame is formed, in which a real transmission data portion DT having transmission data stored therein and a preamble portion DP composed of pseudo noise signal strings arranged a given interval apart from the adjacent real transmission data portion DT are mixed. Then, the transmission data frame is subjected to BPSK modulation and sent out. In parallel with this, the superposing unit 21a superposes a control signal representing a timing to send the preamble portion DP on the voltage of the source line LP thereby to feed the control signal to the control part 36 in the second body part 2 by wire communication. Therefore, the control part 36 in the second body part 2 does not have to perform a preamble portion-detecting process of monitoring and detecting a preamble portion DP of a received data. The phase-adjusting part 43 sequentially selects a delayed local oscillator output according to the control signal, and the correlator 41 detects the correlation of a pseudo signal string PNi of a preamble portion DP output from the limiter 40. Thus, it becomes possible to synchronize in phase a received local oscillator output correctly and in a short time using a simple configuration as described above, and therefore a good receiving condition can be ensured.

Incidentally, in an example in the prior art, a timing of the top of a pseudo noise signal string is unknown and as such, in the case where a sliding correlator of a small circuit scale is used, its detection time is very long, and therefore it is required to use a matched filter of a large circuit scale for the purpose of shortening its detection time. Thus, a small circuit scale is not realized and it is impossible to execute the phase synchronization in a short time.

As described above, in the invention a control signal representing a timing of transmitting a preamble portion is sent out to the receiving side by wire communication. Therefore, the phase-adjusting control part 37 of a small circuit scale can perform the phase synchronization correctly in a short time. As a result, the power consumption on the receiving side can be reduced significantly.

Further, because the control signal is superposed on the voltage of the source line LP and sent out by wire communication, the interconnection between the first body part 1 and the second body part 2 can be made a minimum necessity, namely only the source line LP.

In regard to the above embodiment, the case where the source line LP is used for transmission of a control signal by wire communication has been described. However, the invention is not so limited. A dedicated communication line for transmission of a control signal by wire communication may be provided between the control parts 21 and 36.

Also, as for the above embodiment, the case where a preamble portion DP consists of n (two or more) pseudo noise signal strings has been described. However, the invention is not so limited. The following arrangement may be possible: the preamble portion DP consists of one pseudo noise signal string, and the phase-adjusting control part 37 receives a plural number of the preamble portions DP thereby to perform the phase synchronization.

Further, with the embodiment, the case where the invention is applied to a clamshell type cellular telephone unit has been described. However, the invention is not so limited. The invention may be applied to a rotary cellular telephone as shown in FIG. 7.

Figure 7:
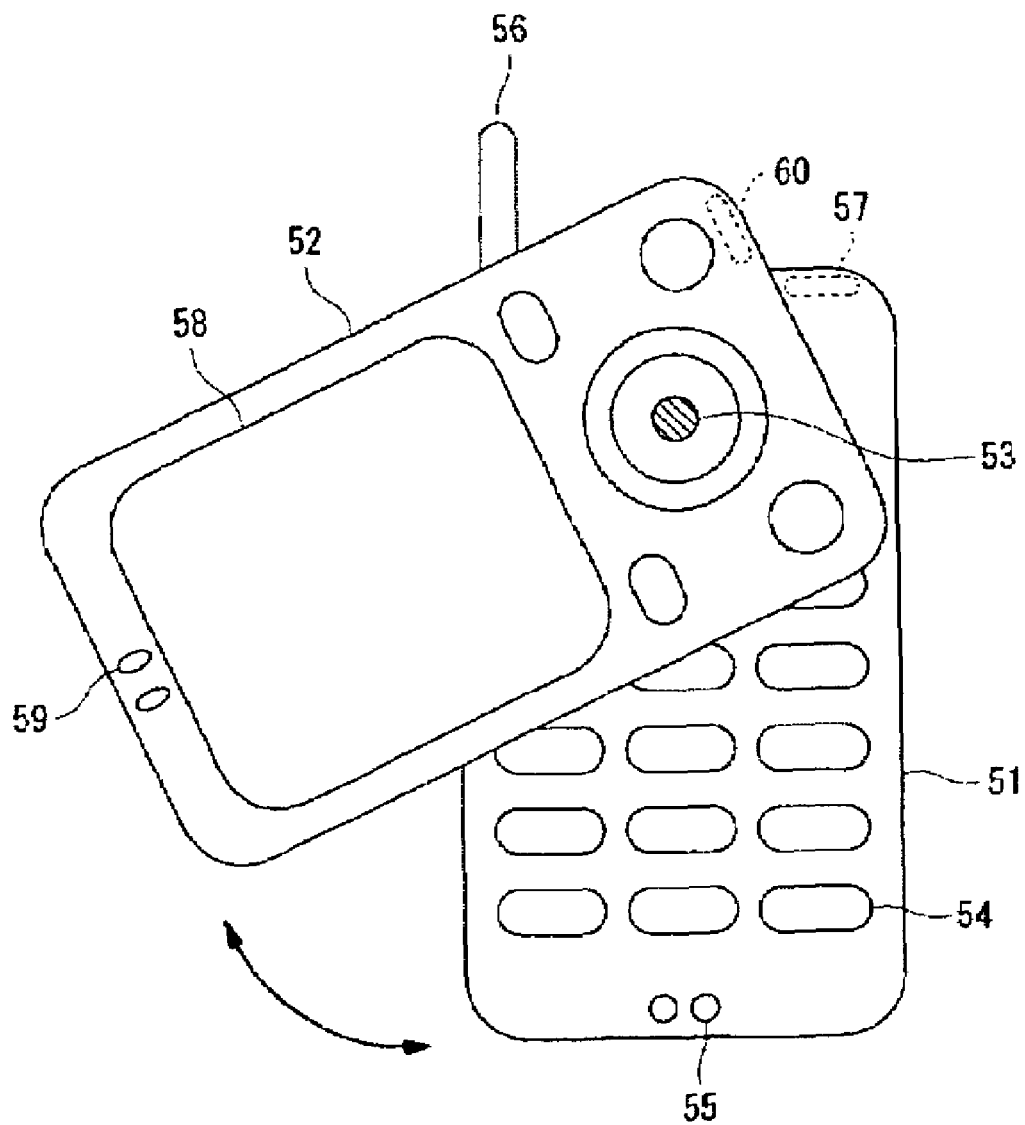
FIG. 7 is a perspective view showing an appearance of a rotary cellular telephone as another embodiment of the invention.
Figure 8A:
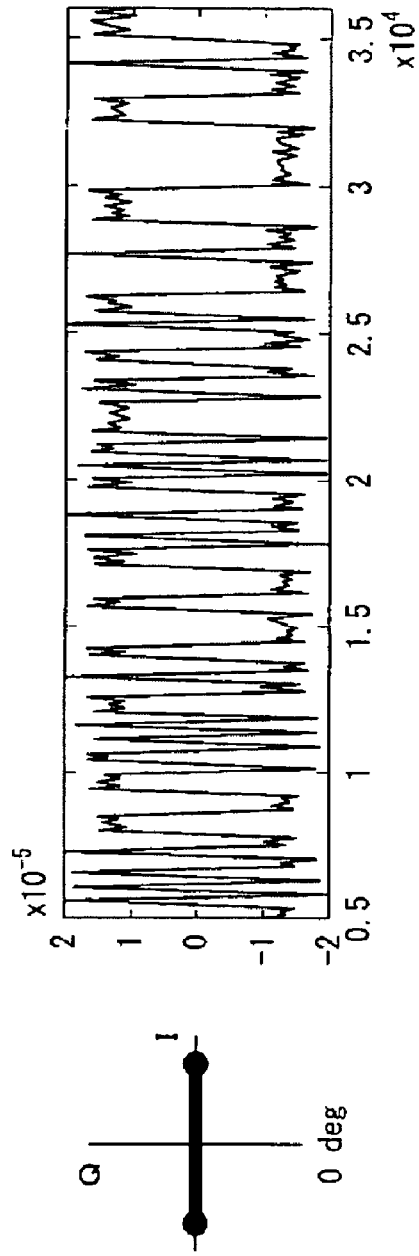
FIG. 8A is a signal waveform illustration showing a received base band signal after the processing by a low-pass filter in the condition where a received local oscillator output is coincident in phase with a sent carrier.
Figure 8B:
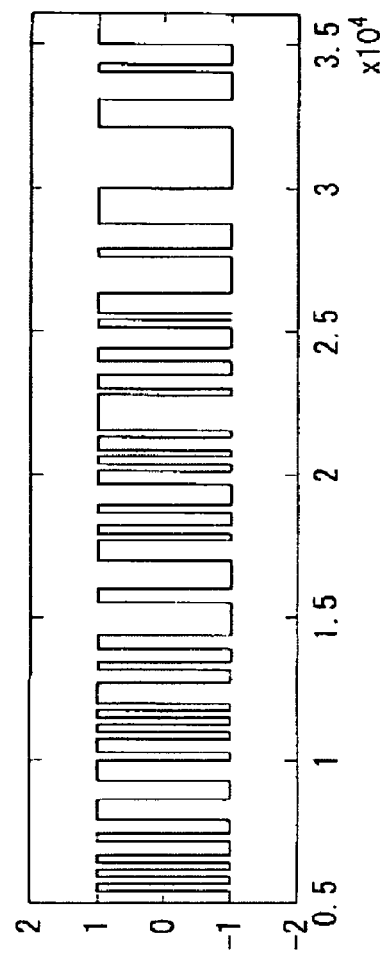
FIG. 8B is a signal waveform illustration showing a received base band signal after the processing by a limiter in the condition where a received local oscillator output is coincident in phase with a sent carrier.
Figure 9A:
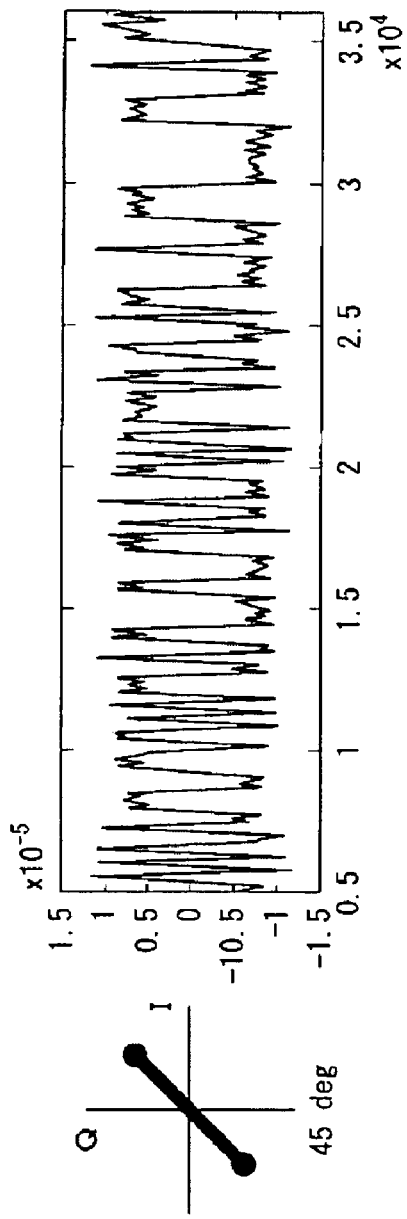
FIG. 9A is a signal waveform illustration showing a received base band signal after the processing by the low-pass filter in the condition where a received local oscillator output is different in phase from a sent carrier by 45°.
Figure 9B:
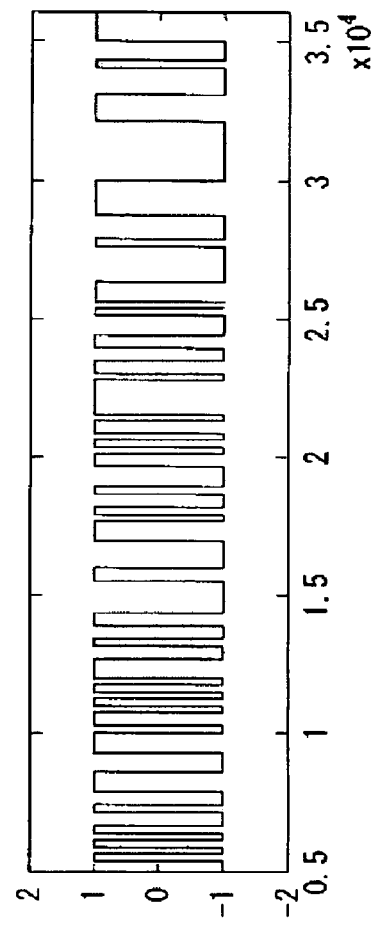
FIG. 9B is a signal waveform illustration showing a received base band signal after the processing by the limiter in the condition where a received local oscillator output is different in phase from a sent carrier by 45°.
Figure 10A:
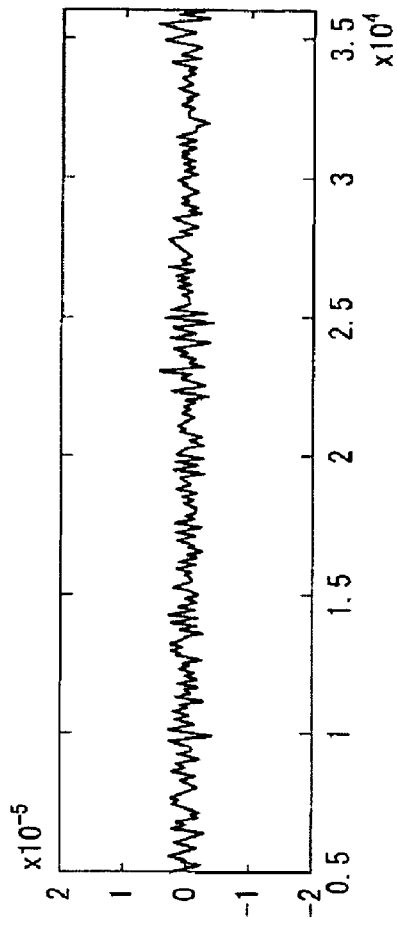
FIG. 10A is a signal waveform illustration showing a received base band signal after the processing by the low-pass filter in the condition where a received local oscillator output is different in phase from a sent carrier by 90°.
Figure 10B:
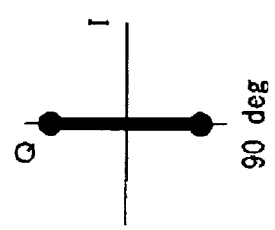
FIG. 10B is a signal waveform illustration showing a received base band signal after the processing by the limiter in the condition where a received local oscillator output is different in phase from a sent carrier by 90°.
Figure 10B:
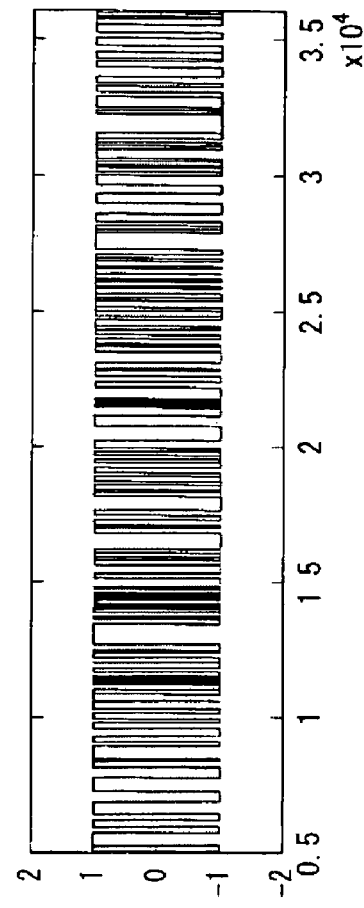

As in FIG. 7, the cellular telephone has: a first body part 51; a set of operation buttons 54 arranged on the side of a surface of the first body part; a microphone 55 provided in a lower end portion of the first body part 51; and an external radio communication antenna 56 attached to an upper end portion of the first body part 51. Also, the cellular telephone has: a second body part 52; a display unit 58 provided on the side of a surface of the second body part 52; and a speaker 59 provided in an upper end portion of the second body part 52. Furthers the cellular telephone has: internal radio communication antennas 57, 60 respectively provided on the first body part 51 and the second body part 52, in which the antennas are used to perform internal radio communication between the first body part 51 and the second body part 52.

The first body part 51 and the second body part 52 are coupled through a hinge 53. By using the hinge 53 as a fulcrum to rotate the second body part 52 horizontally, the second body part 52 can be made to overlie the first body part 51, and the second body part 52 can be moved from a place where it is positioned over the first body part 51. When the second body part 52 is made to overlie the first body part 51, the set of operation buttons 54 can be protected by the second body part 52. Therefore, it is possible to prevent the operation button 54 from being pushed when the cellular telephone is carried. Also, by horizontally rotating the second body part 52 to move the second body part 52 from the first body part 41, the following are made possible: to push the operation button 54 while watching the display unit 58; and to talk by telephone while using the speaker 59 and the microphone 55.

The internal radio communication antennas 57, 60 respectively provided on the first body part 51 and the second body part 52 enables the execution of data transmission between the first body part 51 and the second body part 52 by internal radio communication using the internal radio communication antennas 57, 60. For example, image and sound data captured by the first body part 51 through the external radio communication antenna 56 can be sent to the second body part 52 to display the image on the display unit 58 and output the sound from the speaker 59 by internal radio communication using the internal radio communication antennas 57, 60.

Therefore, the need for engaging a flexible wiring board to which the multiple pin technique is applied with the hinge 53 is eliminated. As a result, an increase in complexity of the structure of the hinge 53 can be suppressed, and the mounting process can be prevented from becoming more troublesome. Hence, the following become possible: to make a cellular telephone more compact, slimmer, and more reliable while an increase of its cost suppressed. Further, a display screen of a cellular telephone can be made larger and the number of its functions can be increased without loss of portability of cellular telephones.

In the above embodiments, the case where the invention is applied to a cellular telephone as the electronic device has been described. However, the invention is not so limited. The invention is applicable to a desired electronic device having a first body part 1 and a second body part 2 coupled by a coupling part such as a hinge, e.g. a video camera, a PDA (Personal Digital Assistance), or a notebook-size personal computer.

For the internal radio communication using the internal radio communication antennas 7, 10, short-range radio of weak radio or UWB radio can be used. In this case, stable internal radio communication can be performed while the output level in the internal radio communication can be suppressed. Therefore, even when the amount of data transmission between the first body part 1 and the second body part 2 is increased, data transmission between the first body part 1 and the second body part 2 can be performed without being restricted by the law. Further, an increase in the number of interconnections between the first body part 1 and the second body part 2 can be suppressed.

In the above-described embodiments, an example of bidirectional communication between the first body part and the second body part has been described. However, the invention may be applied to unidirectional communication between the first body part and the second body part. Further, while a radio communication terminal having a first body part and a second body part connected through a hinge as an example has been described, the invention may be applied to wireless connection between modules accommodated in the same housing.

The entire disclosure of Japanese Patent Application No. 2005-052599, filed Feb. 28, 2005 is expressly incorporated by reference herein.

What is claimed is:

1. An electronic device comprising:
    a radio transmitting part which transmits, by radio, transmission data having a real transmission data portion and a preamble portion mixed, the preamble portion constituted by pseudo noise signals arranged in a given pattern;
    a radio receiving part near the radio transmitting part, which receives transmission data transmitted from the radio transmitting part and has a phase-adjusting control part, the phase-adjusting control part adjusting a phase of a received local oscillator output based on the pseudo noise signals of the preamble portion; and
    a wire communication part which communicates a timing of transmitting the preamble portion in the transmission data transmitted by the radio transmitting part to the radio receiving part by wire.

2. The electronic device of claim 1, wherein the radio transmitting part is arranged so as to BPSK-modulate and transmit the preamble portion.

3. The electronic device of claim 1, wherein the preamble portion is formed by repeating a pseudo noise signal string composed of a given number of bits at least two times.

4. The electronic device of claim 1, wherein the radio receiving part comprises:
    a frequency-converting part which converts a frequency of received data when receiving transmission data from the radio transmitting part;
    a limiter part which binarizes a frequency-converted signal output from the frequency-converting part;
    a correlator which detects a correlation between the pseudo noise signals of the preamble portion output from the limiter part based on the timing of transmitting the preamble portion input from the wire communication part and reference pseudo noise signals produced based on a local oscillator output input thereto;
    a local oscillator which produces the local oscillator output; and
    a phase-adjusting control part which the local oscillator adjusts in phase and outputs a local oscillator output to the correlator and the frequency-converting part, and determines the phase of the local oscillator output to be output, based on a detected correlation signal from the correlator.

5. The electronic device of claim 1, wherein the wire communication part comprises:
- a mixing unit which superposes a control signal representing the timing of transmitting the preamble portion on a voltage of a source line; and
- a separator which separates the control signal mixed by the mixing unit from the voltage of the source line.

6. A radio communication terminal comprising:
- a first body part;
- a second body part coupled with the first body part;
- a coupling part which couples the first and second body parts so that locational relation between the first and second body parts can be changed;
- an external radio communication antenna attached to one of the first and second body parts;
- an external radio communication control part incorporated in the first body part, which is mainly responsible for control of external radio communication performed through the external radio communication antenna;
- a display part incorporated in the second body part;
- a first internal radio communication antenna attached to the first body part;
- a second internal radio communication antenna attached to the second body part;
- a first internal radio communication control part incorporated in the first body part, the control part responsible for control of internal radio communication by which transmission data having a real transmission data portion and a preamble portion mixed is transmitted through the first internal radio communication antenna the preamble portion constituted by pseudo noise signals arranged in a predetermined pattern;
- a second internal radio communication control part incorporated in the second body part and having a phase-adjusting control part which controls in phase a received local oscillator output based on the pseudo noise signals of the preamble portion when receiving the transmission data through the second internal radio communication antenna; and
- a wire communication part which communicates a timing of transmitting the preamble portion in the transmission data transmitted by the first internal radio communication control part to the second internal radio communication control part by wire.

7. A method of data transmission comprising the steps of:
- transmitting transmission data having a real transmission data portion and a preamble portion mixed from a radio transmitting part by radio, the preamble portion constituted by pseudo noise signals arranged in a predetermined pattern;
- communicating a timing of transmitting the preamble portion in the transmission data to be transmitted by the radio transmitting part to a radio receiving part located near the radio transmitting part by wire; and
- receiving transmission data transmitted from the radio transmitting part while adjusting in phase a received local oscillator output based on pseudo noise signals of the preamble portion based on the timing of transmitting the preamble portion communicated by wire.

* * * * *